United States Patent [19]

Ikehata

[11] Patent Number: 4,516,863

[45] Date of Patent: May 14, 1985

[54] ELECTRONIC TIMEPIECE OPERABLE IN CONTINUOUS AND STEPWISE MODES

[75] Inventor: Yukio Ikehata, Tokyo, Japan

[73] Assignee: Seiko Instruments & Electronics Ltd., Tokyo, Japan

[21] Appl. No.: 539,713

[22] Filed: Oct. 6, 1983

[30] Foreign Application Priority Data

Oct. 7, 1982 [JP] Japan ................................ 57-176577

[51] Int. Cl.3 ............................ G06F 1/04; G04F 5/00

[52] U.S. Cl. .................................... 368/157; 160/185; 160/160

[58] Field of Search ................ 368/185, 186, 156–160; 318/696

[56] References Cited

U.S. PATENT DOCUMENTS

| | | | |
|---|---|---|---|
| 3,953,778 | 4/1976 | Bray | 318/764 |
| 4,081,735 | 3/1978 | Bray | 318/764 |
| 4,274,150 | 6/1981 | Ikenishi et al. | 368/185 |

FOREIGN PATENT DOCUMENTS

| | | |
|---|---|---|
| 2195808 | 8/1974 | France . |

*Primary Examiner*—Bernard Roskoski
*Attorney, Agent, or Firm*—Robert E. Burns; Emmanuel J. Lobato; Bruce L. Adams

[57] ABSTRACT

An electronic timepiece having a step motor is driven by a drive circuit which selectively produces either continuous hand-carrying pulses or stepwise hand-carrying pulses. The continuous hand-carrying pulses are produced by a continuous hand-carrying waveform shaping circuit connected to a frequency divider, and the stepwise hand-carrying pulses are produced by a stepwise hand-carrying waveform shaping circuit connected to the frequency divider. The selection of either the continuous hand-carrying pulses or the stepwise hand-carrying pulses is executed by a hand-carrying mode selection circuit in response to the operation of a reset switch for resetting the frequency divider.

4 Claims, 12 Drawing Figures

ELECTRONIC TIMEPIECE OPERABLE IN CONTINUOUS AND STEPWISE MODES

BACKGROUND OF THE INVENTION

The present invention relates to an electronic timepiece which selectively functions in both a stepwise hand-carrying mode and a continuous hand-carrying mode.

The conventional electronic timepieces have heretofore been designed to operate either in a stepwise hand-carrying manner or in a continuous hand-carrying manner. Therefore, the user must choose either the stepwise hand-carrying model or the continuous hand-carrying model when purchasing a timepiece. Further, in case the user who had purchased the stepwise hand-carrying model later wishes that he had bought the continuous hand-carrying model, he could do nothing but to also buy the other model. Moreover, even when the user wishes to buy a timepiece of a design which he likes and which operates in the continuous hand-carrying manner, the particular model which he likes often may not be available. That is, the model before him may be of a design which he likes but which operates in the stepwise hand-carrying manner. In such a case, he must forego the purchase of a timepiece or reluctantly buy one which is not his first preference.

SUMMARY OF THE INVENTION

The present invention aims to avoid such a disadvantage and seeks to expand the freedom of choosing a timepiece. Namely, the present invention provides a timepiece which enables the user to select either the continuous hand-carrying mode or the stepwise hand-carrying mode.

The objects of the present invention are achieved by an electronic timepiece having an oscillation circuit, a frequency-dividing circuit, a drive circuit, a step motor, and gear train wheels, wherein the output of said drive circuit consists of n pulses (where n is an integer of 2 or greater) per second. The timepiece includes a circuit which produces n pulses (hereinafter referred to as continuous hand-carrying pulses) having a period of 1/n second, a circuit which produces n pulses (hereinafter referred to as stepwise hand-carrying pulses) that occur in a concentrated manner in a particular section of a second, and a circuit which selects the continuous hand-carrying pulses and the stepwise hand-carrying pulses upon operation of an external switch. Further, when the number of poles of the step motor is k, the reduction ratio of the gear train wheels from the rotor of the step motor to the wheel on which the second hand is mounted, is 1 to 60n/k.

BRIEF DESCRIPTION OF THE DRAWINGS

The drawings illustrate an embodiment of the present invention, in which.

DETAILED DESCRIPTION OF THE INVENTION

Figure 1:
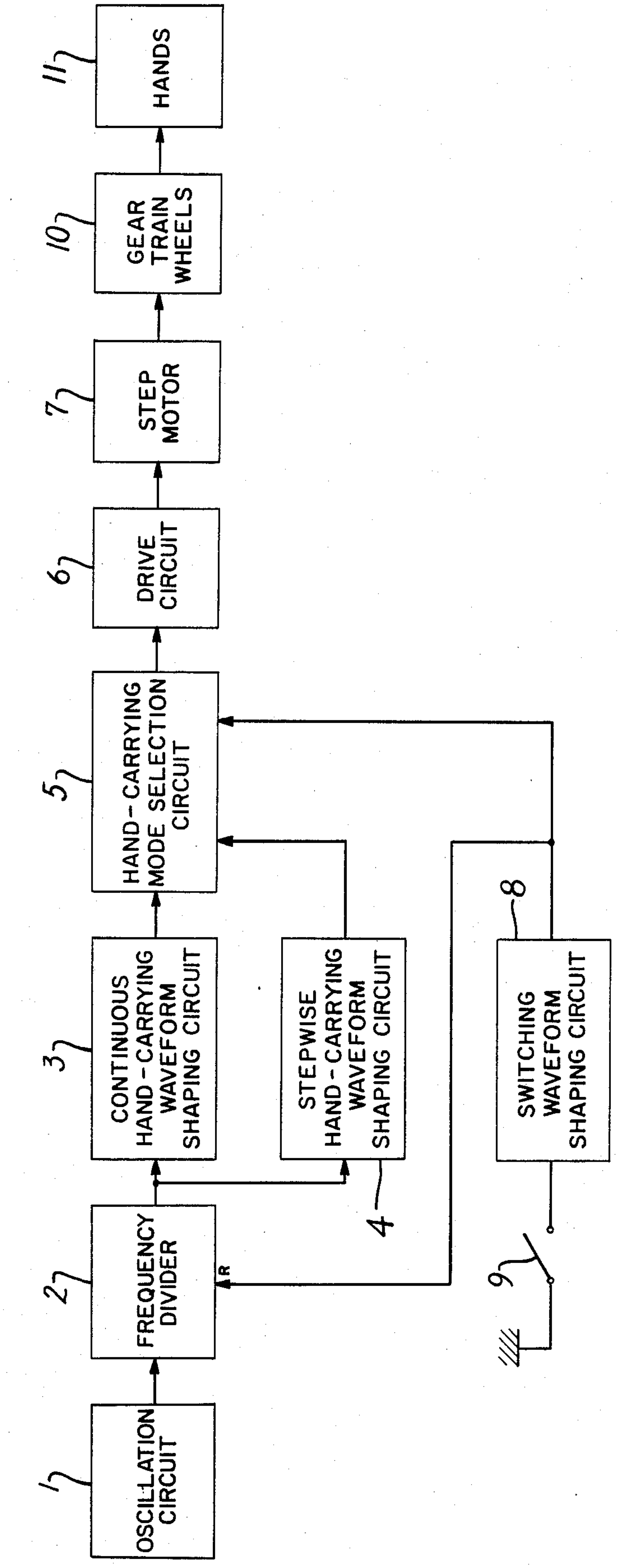
FIG. 1 is a block diagram schematically illustrating the invention.
Figure 2:
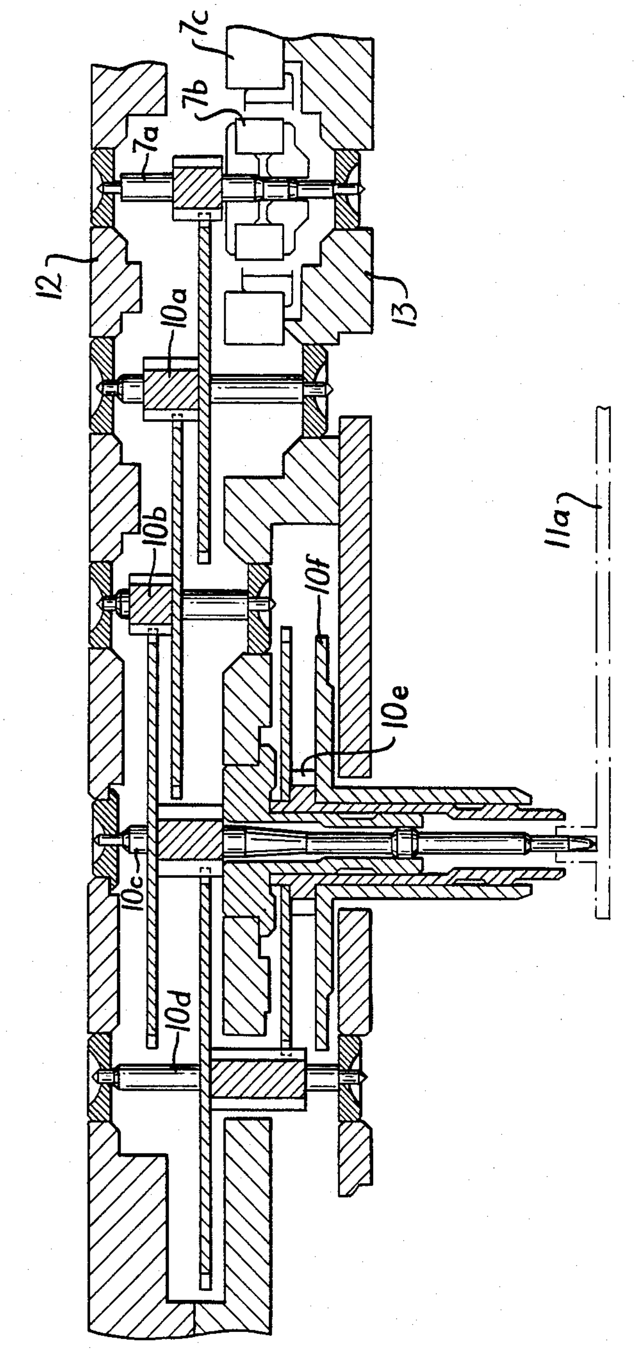
FIG. 2 is a section view of a gear train wheel mechanism.
Figure 3:
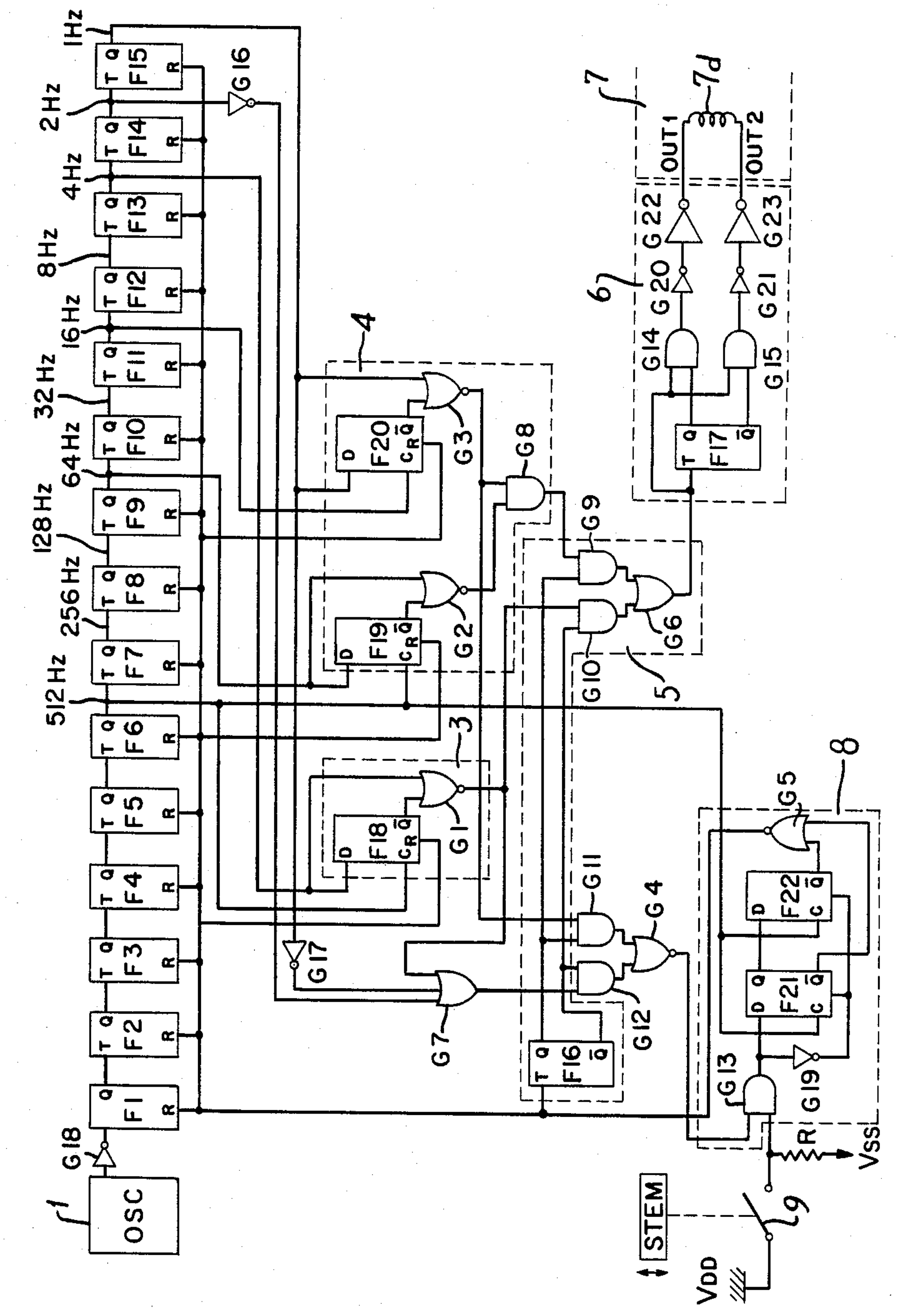
FIG. 3 is a diagram which illustrates the circuit in detail.

The invention will be described below in detail in conjunction with the drawings which illustrate an embodiment of the present invention. FIG. 1 is a block diagram which schematically illustrates the invention, FIG. 2 is a section view of a gear train wheel mechanism, FIG. 3 is a diagram which illustrates in detail the circuit of the embodiment, and FIGS. 4 to 12 are timing charts of the circuit of FIG. 3. In this embodiment, n=4 and k=2 (where n denotes the number of pulses produced by the drive circuit in one second, and k denotes the number of poles of the step motor).

Figure 4:
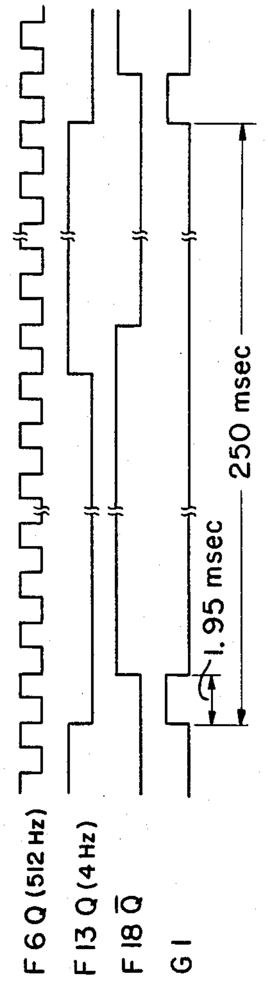
FIGS. 4 to 12 are timing charts of the circuit of FIG. 3.
Figure 5:
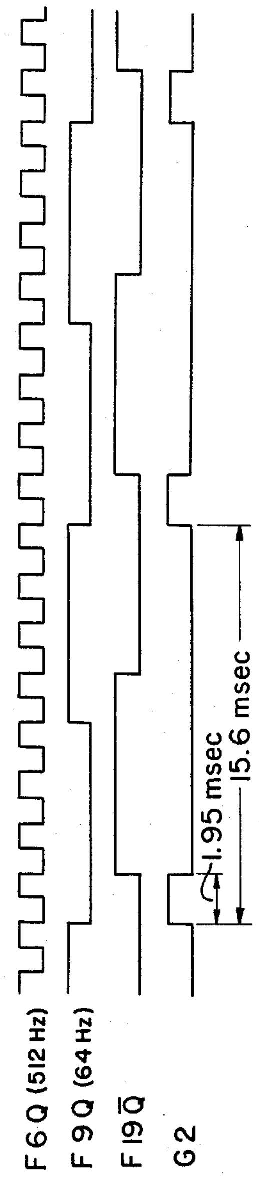
Figure 6:
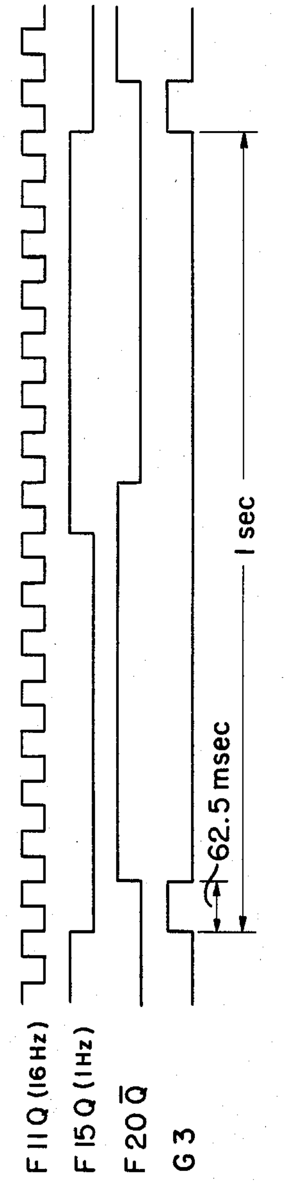
Figure 7:
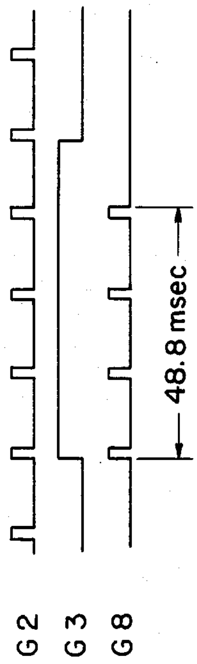
Figure 8:
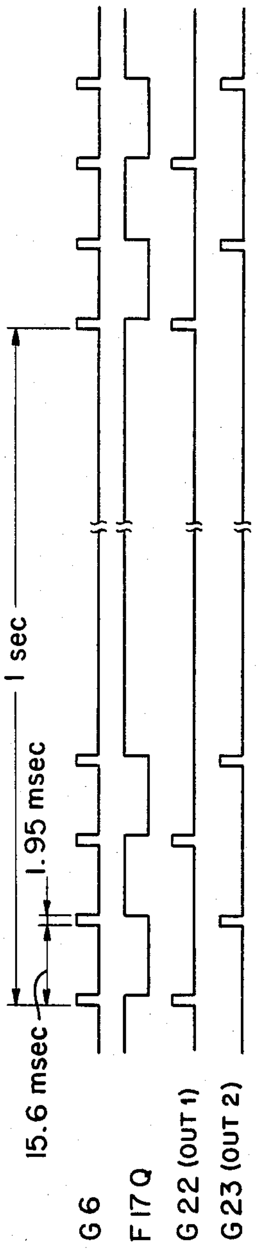
Figure 9:
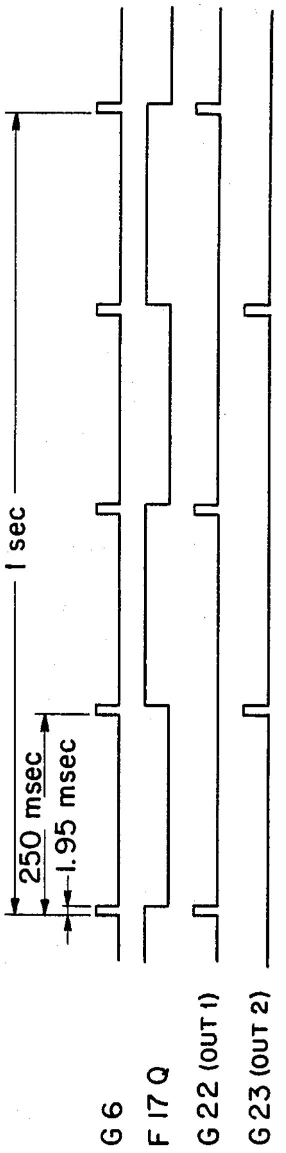

In the drawings, reference numeral 1 denotes an oscillation circuit which oscillates at a frequency of 32,768 Hz, and 2 denotes a frequency-dividing circuit which in FIG. 3 consists of T-type flip-flop circuits F1 to F15. Reference numeral 3 denotes a continuous hand-carrying waveform shaping circuit which produces continuous hand-carrying pulses and which, in FIG. 3, consists of a D-type flip-flop circuit F18 and a NOR gate G1, and of which the timing chart is as shown in FIG. 4. Reference numeral 4 denotes a stepwise hand-carrying waveform shaping circuit which in FIG. 3 consists of D-type flip-flop circuits F19, F20, NOR gates G2, G3, and AND gate G8, and of which the timing charts are as shown in FIGS. 5, 6 and 7. Reference numeral 5 denotes a hand-carrying mode selection circuit which in FIG. 3 consists of a T-type flip-flop circuit F16, AND gates G9, G10, and an OR gate G6. Reference numeral 6 denotes a drive circuit which in FIG. 3 consists of a T-type flip-flop circuit F17, AND gates G14, G15, predrivers G20, G21, and drivers G22, G23. FIG. 8 illustrates a timing chart when the stepwise hand-carrying mode is selected, and FIG. 9 illustrates a timing chart when the continuous hand-carrying mode is selected. Reference numeral 7 denotes a step motor which consists of a rotor pinion 7*a*, a rotor magnet 7*b*, a stator 7*c*, and a coil 7*d*. Reference numeral 8 denotes a switching waveform shaping circuit which in FIG. 3 consists of D-type flip-flop circuits F21, F22, an AND gate G13, a NOR gate G5, and an inverter G19, and of which the timing chart is as shown in FIG. 22. In FIG. 3, symbol R denotes a pull-down resistor. Further, reference numeral 9 denotes a mode selection switch for selecting either the continuous hand-carrying mode or the stepwise hand-carrying mode, and which in FIG. 3 also functions as a reset switch for resetting the frequency divider 2 when the stem (or crown) is pulled out.

Figure 10:
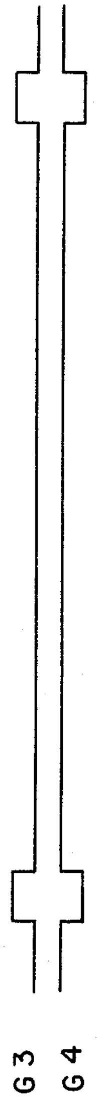
Figure 11:
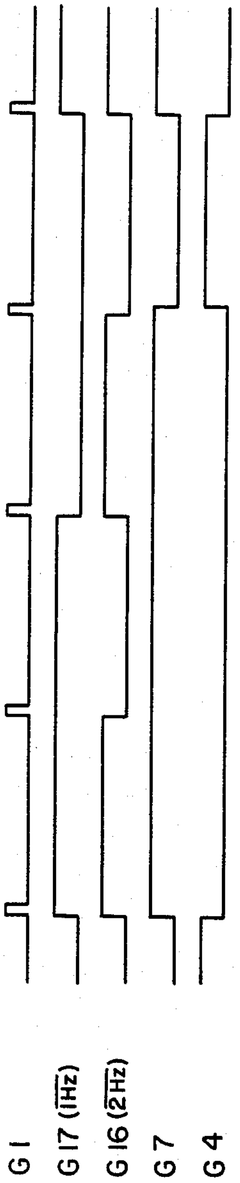

In FIG. 3, the AND gates G11, G12, and NOR gate G4 constitute a circuit for selecting the period of reset inhibition together with the T-type flip-flop circuit F16. FIG. 10 shows a timing chart when the stepwise hand-carrying mode is selected, and FIG. 11 shows a timing chart when the continuous hand-carrying mode is selected. Reference numeral 10 denotes a train of gear wheels, which consists, as shown in FIG. 2, of a sixth wheel 10*a*, a fifth wheel 10*b*, a fourth wheel 10*c*, a third wheel 10*d*, a second wheel 10*e*, a minute wheel (not shown), and an hour wheel 10*f*.

Reference numeral 11 denotes hands for indicating the time. A second hand 11*a* is mounted on the fourth wheel 10*c*, a minute hand is mounted on the second wheel 10*e*, and an hour hand is mounted on the hour wheel 10*f*. The rotor having two poles (k=2) turns by 180° upon receipt of a drive pulse. When n=4, therefore, the rotor turns by 720° in one second. Therefore, if the reduction ratio from the rotor to the fourth wheel is set to be 1:120, the second hand turns by an amount of one second, i.e., 6°. To obtain the reduction ratio of 1:120, the rotor pinion should have 6 teeth, the sixth wheel gear should have 24 teeth, the sixth wheel pinion should have 6 teeth, the fifth wheel gear should have 36 teeth, the fifth wheel pinion should have 6 teeth, and the fourth wheel gear should have 30 teeth.

When the T-type flip-flop circuit F16 produces the output Q of the high level and output $\overline{Q}$ of the low level, the outputs of AND gate G8 of FIG. 7 appear on the NOR gate G6, and the drive circuit 6 produces outputs OUT 1, OUT 2 as shown in FIG. 8. Therefore, the step motor 7 is driven by four pulses which are concentrated within about 48.8 msec, and the second hand turns by an amount of one second. Namely, the hand is carried stepwisely quite in the same manner as the stepwise hand-carrying mode which is driven by one pulse in one second.

Figure 12:
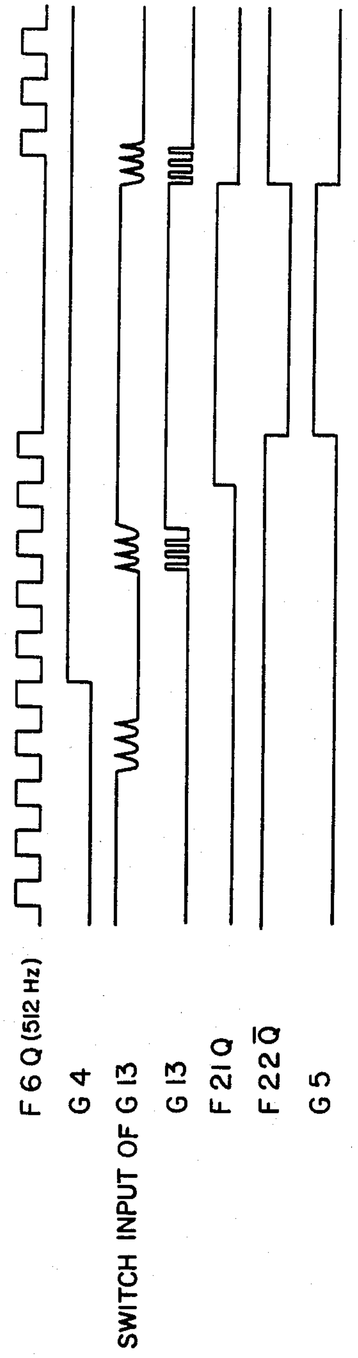

Then, if the switch 9 is turned on and is then off, the NOR gate G5 produces an output as shown in FIG. 12. In synchronism with the break of the output of NOR gate G5, the output Q of the T-type flip-flop circuit F16 changes from the high level to the low level, and the output $\overline{Q}$ changes from the low level to the high level. Therefore, the output of NOR gate G1 shown in FIG. 4 appears as the output of OR gate G6, and the drive circuit 6 produces outputs OUT 1, OUT 2 as shown in FIG. 9. That is, drive pulses OUT 1, OUT 2 are alternately produced at a period of 250 msec and, hence, the second hand moves by an amount of $\frac{1}{4}$ second after every $\frac{1}{4}$ second. In other words, the second hand moves little by little and appears to move continuously. By setting the number n of pulses to be about 16 to 32, it is possible to so move the hand that it appears to move completely and continuously (sweeping) to the human eyes. If the switch 9 is turned on again and then off, the output of the T-type flip-flop circuit F16 is inverted again, and the hand moves stepwisely.

The output of NOR gate G4 which is input to the AND gate 13 is changed by a reset inhibition signal depending upon the selection of the hand-carrying mode. In the case when the stepwise hand-carrying mode is selected with the output Q of T-type flip-flop circuit F16 being of the high level the, output of the NOR gate G4 assumes the low level to inhibit the circuit from being reset during the period of 62.5 msec in which four pulses are produced in a concentrated manner to stepwisely drive the hand as shown in FIG. 10. When the continuous hand-carrying mode is selected, furthermore, the output of the NOR gate G4 assumes the low level to inhibit the circuit from being reset during the period of about 752 msec until four pulses equal to one second are produced as shown in FIG. 11. Thus, the period of reset inhibition is changed depending upon the selection of the hand-carrying mode, and the circuit is reset after n=4 pulses equal to one second are produced. Even when the circuit is reset and the second hand is temporarily halted, therefore, the second hand does not stop midway between graduates of seconds.

Further, although not shown in the drawings, it is also possible according to this embodiment of the present invention to provide a power-source voltage detector circuit and sent its output to the hand-carrying mode selection circuit, such that the hand-carrying mode is alternately switched maintaining a predetermined period when the power supply voltage has dropped to thereby let the user know that the cell is nearly depleted. For instance, the continuous hand-carrying mode and the stepwise hand-carrying mode may be switched alternately after every second when the cell voltage has dropped below a certain level.

According to the present invention as described above, the stepped hand-carrying mode and the continuous hand-carrying mode can be arbitrarily selected by the user. Further, the purchaser need not worry about whether the timepiece is of the stepwise hand-carrying type or the continuous hand-carrying type. That is, the invention offers increased freedom for choosing the type of timepiece. The invention also offers additional values for the timepiece manufacturers. Namely, the manufacturer need not produce timepieces of two series, i.e., a model of the continuously hand-carrying type and a model of the stepwisely hand-carrying type.

What is claimed is:

1. In an electronic timepiece having an oscillation circuit, a frequency-dividing circuit, a drive circuit, a step motor, and gear train wheels for driving a set of hands including a second hand, the improvement wherein: the drive circuit has means for producing an output of n pulses (where n is an integer of 2 or greater) per second; a first circuit for producing n pulses serving as continuous hand-carrying pulses having a period of 1/n second; a second circuit for producing n pulses serving as stepwise hand-carrying pulses that occur in a concentrated manner in a particular section of a second; a mode selection circuit operative to select said continuous hand-carrying pulses and said stepwise hand-carrying pulses upon operation of an external switch; and wherein when the number of poles of said step motor is k, the reduction ratio of the gear train wheels from the rotor of the step motor to the wheel on which the second hand is mounted, is 1 to 60n/k.

2. An electronic timepiece as set forth in claim 1, wherein the external switch comprises a displaceable stem for alternately selecting the continuous hand-carrying pulses and the stepwise hand-carrying pulses every time the external switch is turned on and off.

3. An electronic timepiece as set forth in claim 1, including means for changing a reset inhibition period for inhibiting the reset of the frequency-dividing circuit depending upon whether the continuous hand-carrying pulses are selected or the stepwise hand-carrying pulses are selected.

4. An electronic timepiece as set forth in claim 3, including means for inhibiting the frequency-dividing circuit from being reset until n pulses equal to one second are produced, irrespective of whether the continuous hand-carrying pulses are selected.

* * * * *